J. C. SCHAFFER.
HYDRATION.
APPLICATION FILED MAR. 10, 1916.
1,220,995.
Patented Mar. 27, 1917.
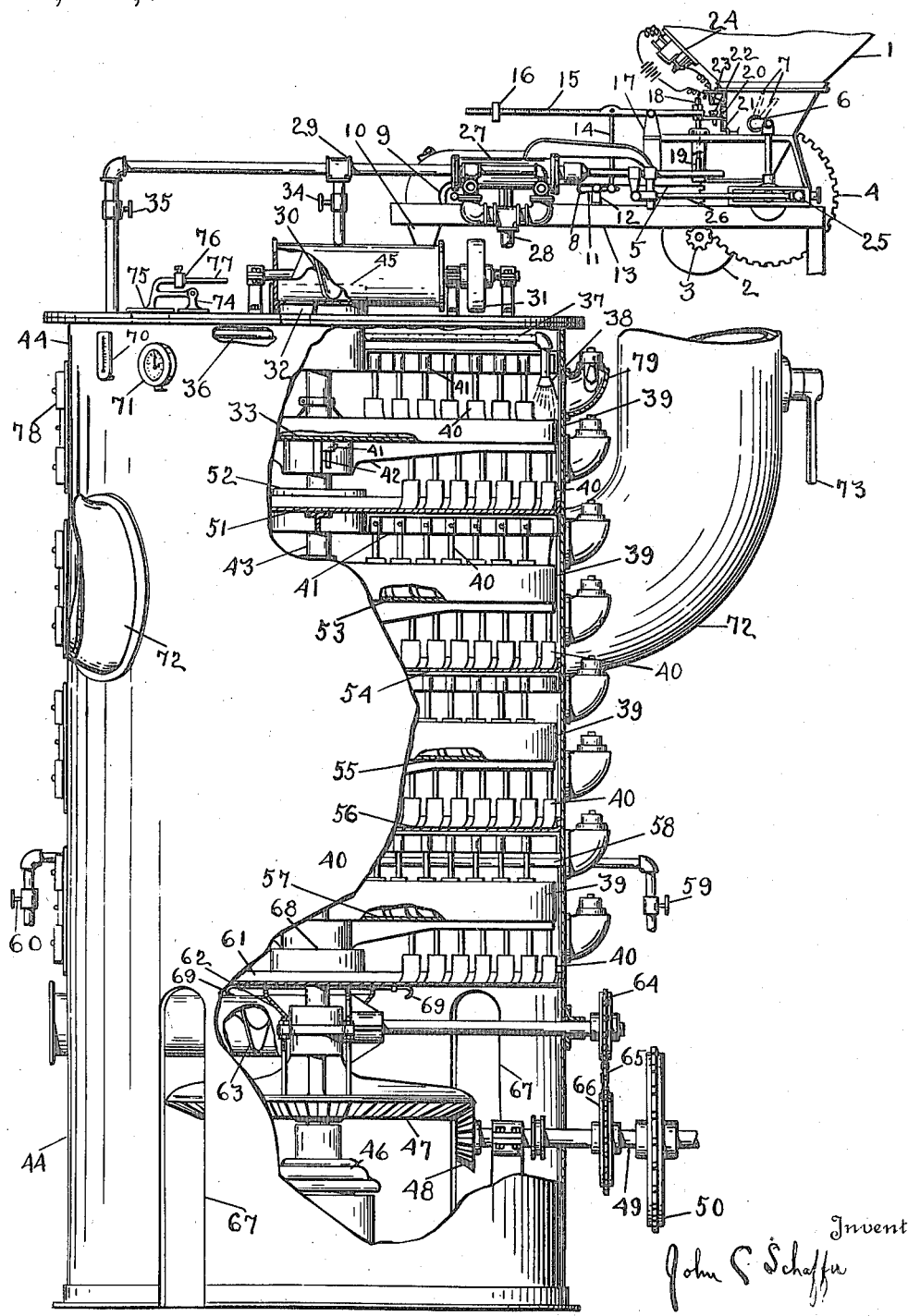
Inventor
John C. Schaffer
By Geo. E. Kirk
Attorney

UNITED STATES PATENT OFFICE.

JOHN C. SCHAFFER, OF TIFFIN, OHIO.

HYDRATION.

1,220,995.  Specification of Letters Patent.  Patented Mar. 27, 1917.

Application filed March 10, 1916. Serial No. 83,241.

*To all whom it may concern:*

Be it known that I, JOHN C. SCHAFFER, a citizen of the United States of America, residing at Tiffin, Seneca county, Ohio, have invented new and useful Hydration, of which the following is a specification.

This invention relates to moistening or slaking material as hydrating lime.

This invention has utility when incorporated in connection with continuous treatment say of quick lime for conversion to a lime hydrate.

Referring to the drawing, the figure is a side elevation with parts broken away disclosing an apparatus for use in carrying out the invention.

The material, as quick lime, may be supplied to the hopper 1. The driving pulley 2 through the pinion 3 and the gear 4 serves to drive the conveyer belt having the upper reach 5 upon which material from the hopper 1 may fall as regularly agitated by the rock arm 6 having loosening fingers 7 working in the hopper 1. This conveyer 5 passes over the adjustably poised idler 8 in its travel about the follower pulley 9 in delivering material through the chute 10. This idler 8 is carried by the lever 11 mounted in the bracket 12 on the machine frame 13. The opposite end of the lever 11 is connected by the link 14 to the scale beam 15 having the adjustable weight 16 thereon.

This scale beam is fulcrumed in the bracket 17 and is connected by the rod 18 to control the gate 19 in the delivery of material from the hopper 1 to the belt 5. This central beam 15 carries the finger 20 movable across the fixed graduation scale 21 as an indicating device for the beam when the feed supply is in accordance with the adjusted per pound travel weight per lineal foot of the belt 5. This finger 20 may have the adjusting screw 22 in its upper position movable to contact the terminal 23 and close a circuit for operating the vibrator or hopper pounder 24 as a means for loosening the material to feed down in the hopper 1 as well as an audible signal to the attendant that the material supply is falling short of the adjusted rate. From the common driving means for the belt 5 there is connected through the adjustable wrist pin 25 the connecting rod 26 for the pump 27 supplying water from the line 28 to the line 29 at a determined volume rate relatively to the determined weight rate of the material supply.

The material from the chute 10 may pass to the screw conveyer 30 driven by the pulley 31 to agitate and spill the material through the opening 32 into the upper chamber of the apparatus centrally of the platform 33. During the handling of the material by the conveyer 30 valve 34 may be manipulated to supply the full or less than full amount of water for effecting hydration of the lime as experimentally determined. Should this supply of water from the line 29 past the valve 34 be less than the full hydration amount and it be even desirable to subject the lime to more than one water treatment, the valve 35 may supply the downwardly directed spray 36, the upwardly directed spray 37 and the terminal sprays 38. With but a slight opening for the valve 35, the downwardly directed sprays 36 and 38 only will operate. The action of the spray 36 is such that the moisture is distributed across the entire platform even at low supply rate, while the action of the spray 38 is to affect the material progress to the outer side of the rotating platform 33 at the time said material is about to be worked over the retaining lip or dam 39 by the plows 40 on the fixed arm 41.

Should the water supply rate be increased, the sprays have capacity to care therefor by the working of the spray 37 to supplement the sprays 36 and 38. The rotary platform 33 is connected by the arms 42 to the shaft 43 centrally mounted in the hydrator housing 44 and carried by the upper bearing 45 and the lower step bearing 46. Adjacent the lower portion of this shaft 43 is the bevel gear 47 for turning the shaft 43. This bevel gear 47 is in mesh with the bevel pinion 48 on the shaft 49, driven by the sprocket wheel 50.

The spill of the material from the mixing chamber or platform 33 delivers the same to the slaking or agitation chamber or platform 51 which is fixedly supported by the arms 41. The material in being delivered to the platform 51 is progressed inwardly thereacross by plows 40 fixed to the arms 42. In this agitation of the material, the lighter or slaked portions progress more rapidly and work to the top, while the unslaked portions of the lime, being heavier, tend to travel more slowly and approach the bottom of the chamber. Accordingly, in this path of material progress, the central lip 52 tends to impede the travel of the unslaked lime while the accumulation of the continuously agitated material tends to work the material over this lip 52 for delivery to the second slaking chamber above the rotary platform 53 which has the material worked thereacross by the plows 40 on the arms 41 of the stationary platform 51. The outer lip or dam 39 on the platform 53 is somewhat higher than the inner lip 52 on the platform 51 as well as the outer lip 39 on the platform 33.

The plows 40 may be adjusted to such angle as desired for regulating the progress of the material across the respective platforms and may be even reversed to retard such progress and thereby supplement the holding or retarding action of the lips 39, 52. From the rotary platform 53, the more or less slaked lime may work over the lip 39 to the third slaking chamber over the stationary platform 54 and thence to a fourth slaking chamber over the movable platform 55 to a fifth slaking chamber over the stationary platform 56. According to the progress rate of the material, the slaking should be completed and the thoroughly slaked lime over the stationary platform 56 falls upon the rotary platform 57 in the drying chamber as warmed by the steam line 58, the heat being controlled by the valves 59, 60. The dried hydrate so warmed is delivered to the stationary platform 61 and agitated thereacross in this mixing chamber for delivery by the chute 62 to the scroll conveyer 63 for discharge from the apparatus. This scroll conveyer 63 is driven by the sprocket wheel 64, chain 65 and sprocket wheel 66 on the shaft 49.

In the bottom of the cylindrical hydrator housing 44 are access or air intake openings 67. The rate of air supply past collar 68 centrally of the platform 61 is controlled by the slides 69 movable to open or close the opening. This lip or collar 68 differs from the collars 52 in that the material on the platform 61 does not in its normal travel progress over this lip but is spilled through the opening in the bottom of the platform 61 into the chute 62. This supply of air is warmed by the steam coil 58 and tends to take up moisture. The chemical reactions in the several slaking chambers also tend to raise the temperatures thereof. This warmed air supply saturated at the drying chamber and such saturation maintained in the lower slaking chambers, rises about the platforms as a moisture saturated atmosphere or blanket into the mixing and first slaking chambers, thereby positively precluding the reaction of the water with the lime from throwing moisture into the atmosphere. This insures a right crumbling of the product and a driving of this heated moisture in its most active penetration state to the region of less resistance in the unslaked lime particles for most ready and thorough hydration. This all penetrating moisture saturated envelop coupled with the agitation uniformly throughout the entire mass precludes any heat generation for burning or non-uniform action of the hydration throughout the entire mass. A superior uniform grade of product is thus assured at all times.

To supplement the control of the enveloping atmosphere the thermometer 70 is provided in communication with such chamber or chambers as desired, in this instance shown as connected with the mixing chamber. This will permit a determination of the temperature while the barometer 71 at such chamber may indicate the pressure condition. In the regulation of the up-draft of air by the slide 69 there may be a restricted discharge by the stack connected flues 72, the flow rate through which may be regulated by the damper 73. For relief of the upper chambers in emergency of extra pressure accumulation or a desired ventilation, the bracket 74 may carry the closure 75 adjustably weighted by the weight 76 on the arm 77. This closure may operate as the blow-off or safety valve automatically at the adjusted pressure, due to the rapid heating and steam generation in the upper sections with the normal discharge more or less congested by the damper 73.

For observation of the condition of the material at any stage of the operation, inspection doors 78 may be opened and the lights 79 remotely disposed, sufficiently illuminate the several chambers that the condition of the stock may be observed as well as any trouble readily and conveniently located.

What is claimed and it is desired to secure by Letters Patent is:

1. The method of continuously hydrating lime embodying the continuous definite proportion supply of lime and water, slaking the lime in a moisture saturated atmosphere, removing the slaked portions from the unslaked portions, and drying the slaked lime by variably transversely progressing the lime between successive falling stages.

2. The method of continuously hydrating lime embodying slaking lime in a moisture saturated atmosphere by variably transversely progressing the lime between successive falling stages.

3. The method of hydrating lime embodying agitating to continuously separate the slaked from the unslaked portions thereof by variably transversely progressing the lime between successive falling stages.

4. The method of hydrating lime embodying moving the material during slaking and working the unslaked material away from the slaked material by variably transversely progressing the lime between successive falling stages.

5. The method of hydrating lime embodying working the slaked lime out of the unslaked lime by variably transversely progressing the lime between successive falling stages.

6. The method of continuously hydrating lime embodying the agitation of a determined weight of lime with a determined volume of water by variably transversely progressing the lime between successive falling stages.

In witness whereof I affix my signature.

JOHN C. SCHAFFER.